B. F. BIRKETT.
PROCESS OF PRESERVING EGGS.
APPLICATION FILED FEB. 17, 1911.
996,696.
Patented July 4, 1911.
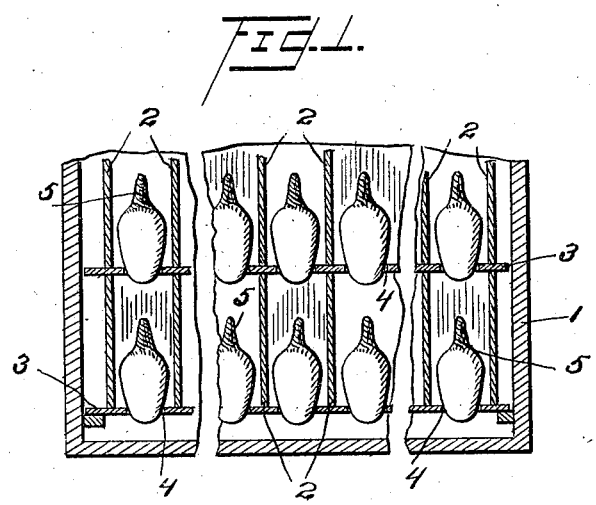
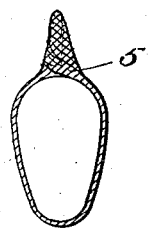
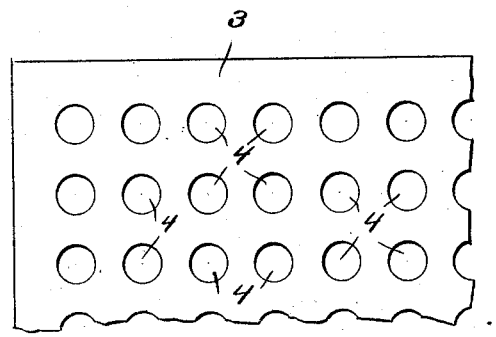
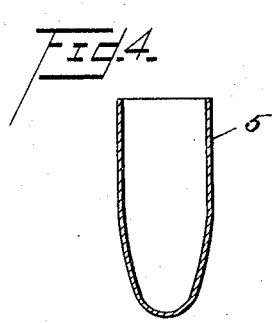
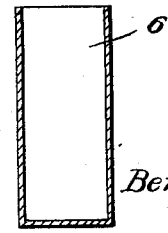
Witnesses
W. Strauss
R. H. Krenkel.
Inventor
Benjamin F. Birkett.
By Joshua R. H. Potts.
Attorney
COLUMBIA PLANOGRAPH CO., WASHINGTON, D. C.

UNITED STATES PATENT OFFICE.

BENJAMIN FRANKLIN BIRKETT, OF NORRISTOWN, PENNSYLVANIA.

PROCESS OF PRESERVING EGGS.

996,696.

Specification of Letters Patent. Patented July 4, 1911.

Application filed February 17, 1911. Serial No. 609,076.

*To all whom it may concern:*

Be it known that I, BENJAMIN FRANKLIN BIRKETT, a citizen of the United States, residing at Norristown, in the county of Montgomery and State of Pennsylvania, have invented certain new and useful Improvements in Methods for Storing Eggs, of which the following is a specification.

My invention relates to improvements in methods for storing eggs, the object of the invention being to so store the eggs as to keep them from spoiling for the maximum length of time, and without the aid of ice or other temperature reducing means.

With this object in view, the invention consists in certain novel steps in the method as will be more fully hereinafter described and pointed out in the claims.

The accompanying drawings illustrate steps of my improved method in which—

Figure 1 is a view in section showing the eggs in position in a crate. Fig. 2, is an enlarged view in section showing one of the eggs inclosed in its bag. Fig. 3, is a plan view of one of the horizontal partitions. Fig. 4, is a sectional view of one of the bags, and Fig 5, is a view illustrating a modified form of bag which might be employed.

In carrying out my improved method, I employ a box or crate 1, which is separated into compartments by means of the ordinary egg separators 2 supported upon horizontal partitions 3, which are composed preferably of paste-board and are provided with openings 4 of appreciably less diameter than the greatest diameter of the egg.

The lowest partition 3 is preferably supported above the bottom of crate 1 for a purpose which will be understood.

Each egg is carefully wrapped in paper, and this wrapping preferably comprises a bag 5 having an end which conforms in shape to the smaller end of an egg. The egg is inserted in this bag and the open end of the bag twisted so as to securely inclose the egg. The egg is then positioned with its smaller end downward and projecting through an opening 4 in one of the partitions 3, so that it is held in this position with the weight of the egg off of the air cell which is in the larger end of the egg.

Instead of employing a particular shaped bag as above described, I might employ an ordinary oblong bag 6 as shown in Fig. 5, or I might wrap the egg in a sheet of paper. In any event, the egg would be entirely inclosed in paper preferably waxed or otherwise treated, so as to prevent any contamination of the egg with the outside air, as it is a well known fact that the shell is porous and will absorb odors and other contaminating matter of the air.

The eggs when positioned with their small ends downward, spaced apart as above set forth, are placed away in a dark dry place, as the light tends to spoil the egg. This method lends itself to municipal regulations, which require the eggs to be stamped with the date upon which they are placed in storage, as this date may be upon the paper wrapper.

Eggs stored in accordance with my improved method, require no ice or refrigeration of any sort, and they will keep for an indefinite length of time if they are maintained in a dry dark place.

The particular structures above set forth may of course be varied without departing from the method, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The herein described method of storing eggs, consisting in inclosing each egg in an air tight wrapper, and supporting the egg with its smaller end downward, substantially as described.

2. The herein described method of storing eggs, consisting in providing a receptacle having partitions therein, said partitions having openings therein, eggs inclosed in bags, the ends of which are secured together to exclude the air, and said eggs positioned in said holes with the smaller ends of the eggs downward, and said receptacle containing said eggs then placed in a dark dry space, substantially as described.

In testimony whereof I have signed my name to this specification in the presence of two subscribing witnesses.

BENJAMIN FRANKLIN BIRKETT.

Witnesses:
O. F. LENHARDT,
GEO. W. ROBERTS.

---

Copies of this patent may be obtained for five cents each, by addressing the "Commissioner of Patents, Washington, D. C."